United States Patent [19]

Acampora

[11] Patent Number: 4,561,012
[45] Date of Patent: Dec. 24, 1985

[54] PRE-EMPHASIS AND DE-EMPHASIS FILTERS FOR A COMPOSITE NTSC FORMAT VIDEO SIGNAL

[75] Inventor: Alfonse Acampora, Staten Island, N.Y.

[73] Assignee: RCA Corporation, Princeton, N.J.

[21] Appl. No.: 565,285

[22] Filed: Dec. 27, 1983

[51] Int. Cl.[4] .................... H04N 9/42; H04N 9/32; H04N 9/535; H04N 5/21

[52] U.S. Cl. .................................. 358/11; 358/36; 358/13; 358/31

[58] Field of Search .................. 358/11, 36, 37, 14, 358/13, 31, 310, 312, 12

[56] References Cited

U.S. PATENT DOCUMENTS

| | | | |
|---|---|---|---|
| 3,305,627 | 2/1967 | Krause | 358/15 |
| 3,843,940 | 10/1974 | Ishiguro et al. | 358/13 X |
| 4,064,530 | 12/1977 | Kaiser et al. | 358/36 |
| 4,107,736 | 8/1978 | Lowry et al. | 358/36 |
| 4,142,205 | 2/1979 | Iinuma | 358/13 |
| 4,200,889 | 4/1980 | Strobele | 358/167 |
| 4,242,704 | 12/1980 | Ito et al. | 358/167 |
| 4,268,855 | 5/1981 | Takahashi | 358/36 |
| 4,291,333 | 9/1981 | Warnock et al. | 358/36 |
| 4,400,718 | 8/1983 | Lee | 358/13 |

OTHER PUBLICATIONS

"Video-Signal Improvement Using Comb Filtering Techniques", G. D. Arndt, et al., IEEE Transactions on Communication, Apr., 1973, pp. 330–336.

Primary Examiner—Howard W. Britton
Assistant Examiner—Michael P. Dunnam
Attorney, Agent, or Firm—Joseph S. Tripoli; George E. Haas; George J. Seligsohn

[57] ABSTRACT

Phase reversal of solely the chrominance component of only alternate frames of an NTSC format signal prior to pre-emphasis and again subsequent to de-emphasis permits simpler and less costly filter structure to be employed without any loss of filtering capability.

7 Claims, 9 Drawing Figures

PRE-EMPHASIS AND DE-EMPHASIS FILTERS FOR A COMPOSITE NTSC FORMAT VIDEO SIGNAL

This invention relates to the use of frame-to-frame fine structure pre-emphasis and de-emphasis filters in a composite NTSC television signal communication system, and, more particularly, to improvements therein which permit more efficient pre-emphasis and de-emphasis filters to be employed.

Reference is made to the article entitled "Video-Signal Improvement Using Comb-Filtering Techniques," by G. D. Arndt, et al., appearing on pages 330–336 of IEEE Transactions on Communication for April 1973. This article discloses that signal-to-noise ratio and picture-quality improvement can be obtained through the use of a pre-emphasis baseband comb filter in the television signal transmitter and a complementary de-emphasis baseband comb filter in the television receiver (in which the respective teeth of the comb filters are spaced at the frame-scanning or line-scanning frequency). As pointed out in the article, the correlation between neighboring picture elements (pixels) in subsequent lines is generally high, being low only for sharp changes from line to line (as is the case for fine structure, such as a horizontal edge, in the image being scanned). The Arndt, et al. article is concerned only with monochrome television signals. In the case of monochrome, there is essentially a complete correlation from frame-to-frame of corresponding pixels of a repetitively scanned stationary image. Only the very fine structure, caused by changes (such as due to movement) in the scanned image content from frame-to-frame, results in low correlation.

As known in the art, comb filter designs (such as finite impulse response—FIR—and infinite impulse response—IIR—filters) are comprised of a digital or analog tapped delay line (with a unit delay between taps equal to the reciprocal of the frequency interval between the teeth of the comb filter), and a weighting and summing circuit coupled to the taps of the delay lines. Including the taps at both input and output of the delay line, a delay line having $N+1$ taps requires a total delay equal to N times the unit delay between taps. On the one hand, it is desirable that N be relatively large because the precision with which the characteristics of a comb filter can be tailored becomes greater as the number of taps (and hence the number of weighting functions) becomes larger. However, providing more taps requires more delay, which, in turn, requires more frame memories (which is undesirable). In a line-to-line comb filter, the unit delay of the delay line requires a line memory carrying a capacity sufficient to store the relatively small number of pixels in a single line. However, in a frame-to-frame comb filter, each unit delay requires a frame memory with sufficient capacity to store the relatively large number of pixels in an entire television frame. Thus, a frame memory is much more costly than is a line memory.

The luminance component of corresponding pixels of a composite NTSC video signal, like a monochrome signal, recurs at a predetermined frame rate of about 30 frames per second. However, the chrominance component of corresponding pixels of a composite NTSC video signal recur only at one-half the predetermined frame rate. The reason for this is that the phase of the NTSC color carrier during each frame is 180° out of phase with the NTSC color carrier during the preceding frame. Thus, it takes a delay of two consecutive frames before the color carrier of the phase-modulated chrominance component of corresponding pixels are in phase with one another. This requires that a frame-to-frame filter for an NTSC video signal have a unit delay of two frames periods, rather than only one frame period. Put another way, such a filter requires N frame memories (where N is restricted to an even integer), while the number of taps is reduced to $(N/2)+1$. To provide more frame memories is expensive, while reducing the number of taps reduces the precision with which the characteristics of the filter can be tailored. Either alternative is undesirable.

The present invention is directed to a system approach which makes it possible to provide, for a composite NTSC video signal, a pre-emphasis or a de-emphasis comb filter which employs $N+1$ taps and requires only N frame memories (where N can be any integer), thereby substantially reducing the cost of such a comb filter with a given number of taps for a composite NTSC video signal.

More specifically, the present invention is directed to improvements in the translation means included in a transmitter for use in a television signal communication system comprising a transmitter and a receiver, as well as improvements in the translation means of the communication system receiver.

The transmitter translation means derives a communication signal communicated to the receiver in response to the application thereto of a composite NTSC format video signal of a two-dimensional image of picture elements (pixels) that are repetitively scanned at the NTSC predetermined frame rate, whereby stationary portions of the image result in the video signal luminance component that recurs at the predetermined frame rate and a video signal chrominance component that recurs only at one-half the predetermined frame rate. The improved transmitter translation means of the present invention comprises first means for modifying the video signal by phase inverting solely the NTSC color carrier and phase-modulated chrominance component of each of alternate frames of the video signal, thereby providing substantially the same phase for the chrominance component of each of the alternate frames as for the chrominance component of each of the remaining frames of the video signal. The improved transmitter translation means of the present invention further comprises second means including a pre-emphasis comb filter coupled to the first means and responsive to the modified video signal for deriving an output in which those frequency components of the modified video signal which are equal to odd integral multiples of half the predetermined frame rate are pre-emphasized with respect to those frequency components of the modified video signal which are equal to even integral multiples of half the predetermined frame rate.

The receiver receives the communication signal from the transmitter having the format derived at the output of the second means of the transmitter translation means. The improved receiver translation means of the present invention, which translates back the translated format received from the transmitter into composite NTSC format, is comprised of first means including a de-emphasis comb filter responsive to the translated format signal communicated to the receiver for deriving an output from the first means in which those frequency components of both the alternate and remaining frames of the translated format which are equal to odd integral multiples of half the predetermined frame rate are de-emphasized, in accordance with a de-emphasis characteristic which is substantially complementary to the pre-emphasis characteristic of the transmitter comb filter with respect to those frequency components of both the alternate and remaining frames of the translated format which are equal to even integral multiples of half the predetermined frame rate. The receiver translation means of the present invention further comprises second means coupled to the first means and responsive to the output therefrom for relatively phase inverting only the color carrier and phase-modulated chrominance component of the respective alternate frame with respect to solely the color carrier and phase-modulated chrominance component of the respective remaining frames, thereby providing a composite NTSC format video signal output from the second means.

Reference is made to co-pending patent application Ser. No. 565,286, which was filed on even date herewith by Acampora, et al., and which is assigned to the same assignee as the present application. This co-pending patent application discloses a television satellite communication system in which a video signal, originally in composite NTSC format, is transformed by an encoder into a serial time-multiplexed IYQY format communicated to a receiver over a satellite communication system. The receiver includes a decoder for transforming the serial time-multiplexed IYQY format back into composite NTSC format. In particular, the television satellite communication system may be a direct broadcast satellite (DBS) system (in which the signal-to-noise ratio of the received signal directly broadcast by the satellite is relatively low). In order to improve the signal-to-noise ratio without degrading the picture quality, it is desirable to use a pre-emphasis comb filter at the transmitter and a de-emphasis comb filter at the receiver. Although not limited thereto, the present invention is particularly suitable for use with such pre-emphasis and de-emphasis comb filters employed in a DBS system. For this reason, the present invention is disclosed in connection with the type of television satellite communication system disclosed in the aforesaid co-pending application of Acampora, et al.

In the drawing:

FIG. 3 is a functional block diagram of the NTSC to time-compressed IYQY multiplexed video signal digital processor shown in FIG. 2a;

Figure 1:
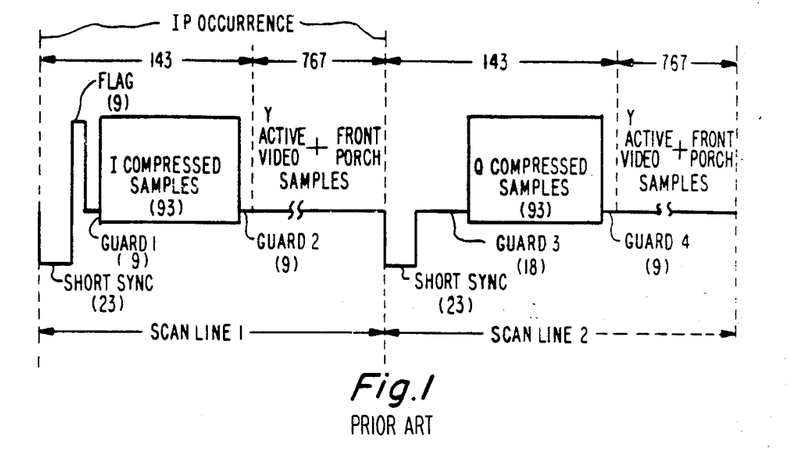
FIG. 1 is a diagram of a serial time-multiplexed IYQY format video signal communicated to a receiver over the type of television satellite communication system disclosed in the aforesaid co-pending application of Acampora, et al.

Referring to FIG. 1, there is shown a horizontal scan line 1 having a time-multiplexed IY format, followed by horizontal scan line 2 having a time-multiplexed QY format. Each scan line, initiated by the occurrence of an initialize pulse (IP) is divided into 910 successive sampling periods, each of which sampling period is one-quarter of an NTSC color carrier period. The first 143 samples periods of scan line 1 are comprised of a short sync (23 sample periods), followed by a flag (9 sample periods), followed by guard 1 (9 sample periods), followed by 93 I (in-phase) compressed samples (each sample occupying one sample period), followed by guard 2 (9 sample periods). The first 143 sample periods of scan line 1 occupy the interval of that horizontal scan line that was originally occupied by the sync + back porch portion of a composite NTSC signal. It will be noted that the 143 sample period back porch portion of scan line 1 does not include the reference phase color burst of the original NTSC format signal. The remaining 767 sample periods of scan line 1 are composed of samples of the Y (luminance) component of the active video and front porch interval of the scan line originally occupied by both the Y and C (chrominance) component of the active video and front porch of the original NTSC format. The respective 93 I compressed samples of scan line 1 are comprised of the first given one out of each successive set of eight consecutive C samples of the original NTSC format.

Scan line 2, shown in FIG. 1, differs from scan line 1 in only two material respects. First, the flag of scan line 1 is missing in scan line 2, so that guard 3 (which replaces both the flag and guard 1) occupies 18 sample periods. Second, the respective 93 I compressed samples of scan line 1 are replaced by 93 respective Q (quadrature) compressed samples. The respective Q compressed samples are comprised of a second given one of each successive set of eight consecutive samples of the C (chrominance) component of the NTSC format. However, in the successive Q sample sets of scan line 2, each given Q-sample of scan line 2 is relatively phase displaced with respect to each first given I sample of the successive I-sample sets of scan line 1 by solely one sample period. Because each sample period is one-quarter of the $\frac{1}{4}f_{CC}$ color carrier period, the I and Q samples transmitted to the receiver represent chrominance information components that are inherently relatively orthogonal to one another and are defined by the phase-modulated NTSC chrominance color carrier frequency $f_{CC}$. Thus, I and Q do not represent any predetermined absolute phases with respect to the reference phase of a color burst (since no reference phase information is provided in the transformed serial multiplexed IYQY format of FIG. 1 that is communicated from the transmitter to the receiver).

Figure 2A:
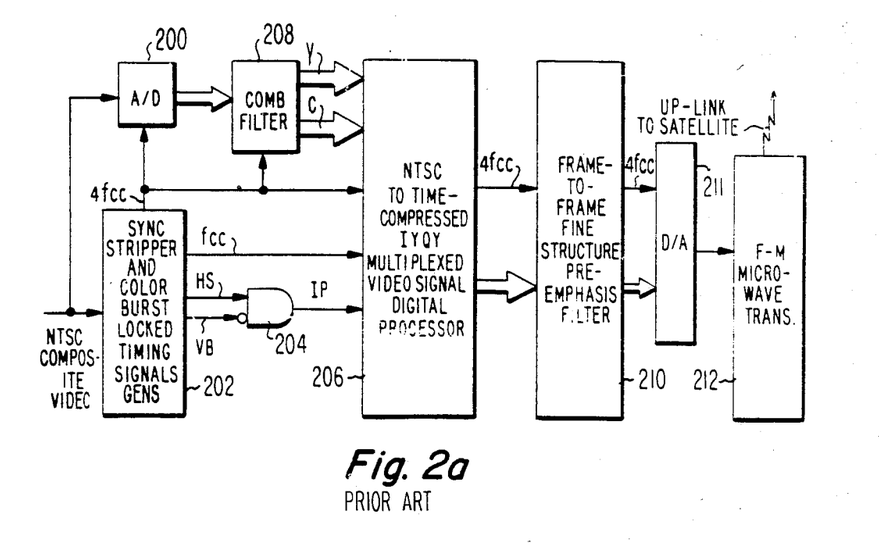
FIGS. 2a and 2b, respectively, are block diagrams of the transmitter and the receiver of the type of television satellite communication system disclosed in the aforesaid co-pending application of Acampora, et al.

The transmitter of FIG. 2a, which is described in detail in the aforesaid co-pending Acampora, et al. application, serves to (1) transform an original NTSC composite video signal into a format in which each of alternate lines of the active portion of each successive television field has the format shown in scan line 1 of FIG. 1 and each of the remaining lines has the format shown in scan line 2 of FIG. 1; (2) pre-emphasize the frame-to-frame fine structure of the transformed format, and (3) communicate this transformed video signal to a receiver (over a satellite communication system) by frequency modulating a microwave transmitter with the transformed video signal.

Briefly, this is accomplished in FIG. 2a by applying sync stripper and color burst locked timing signals generators 202 to derive a sampling frequency $4f_{CC}$ in a continuous wave color frequency $f_{CC}$ phase locked with respect to the reference phase color burst of the NTSC composite video signal applied as an input to clock 202; derive a horizontal sync pulse HS in response to the leading edge of horizontal sync signal of the NTSC composite video applied as an input thereto; and generate a vertical blanking signal VB during the vertical blanking period of the NTSC composite video applied thereto. A decoder gate 204, responsive to HS and VB, derives an initialize pulse IP only during the active portion of each television field (that is, except during the vertical blanking interval). As indicated in FIG. 1, IP occurs in time coincidence with the leading edge of the horizontal sync. The NTSC composite video is converted to digital form by analog-to-digital (A/D) converter 200. The sampling frequency of A/D 200 is $4f_{CC}$. (This is also the sampling frequency of comb filter 208, digital processor 206, de-emphasis filter 210 and digital-to-analog—D/A—converter 211.) Typically, A/D 200 produces a multibit (e.g., eight bit) binary number that represents the level of each successive sample. The samples from A/D 200 are separated into Y and C components by comb filter 208 in a manner well known in the art.

Digital processor 206, which is responsive to the separate Y and C samples applied thereto, as well as the color carrier $f_{CC}$ and successive initialize pulses IP, derive, in digital form, the format shown in FIG. 1.

Figure 3:
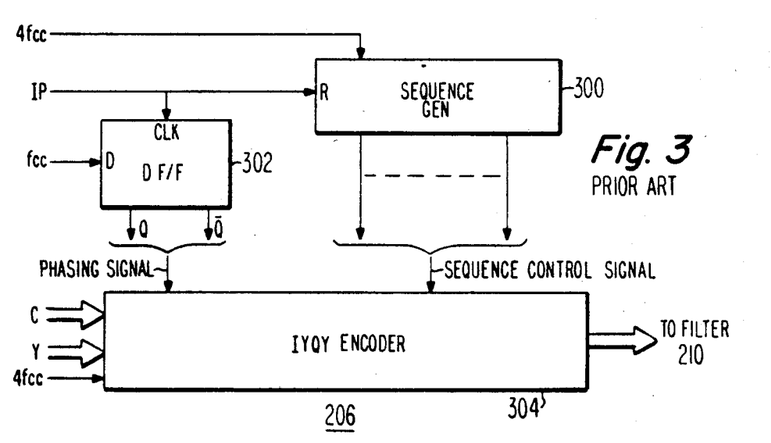

Referring to FIG. 3, there is shown, in a block diagram, the functional components of digital processor 206. As indicated in FIG. 3, block 206 includes a sequence generator 300, a D flip-flop 302, and an IYQY encoder 304. Sequence generator 300 is nothing more than a counter, which is reset in response to each successive IP, and associated gates for counting the 910 successive sample periods of each horizontal scan line and deriving therefrom sequence control signals which, among other things, define respective intervals of the short sync, flag, the respective guards, and the I and Q time-compressed samples and the Y active video and front porch samples (shown in FIG. 1). These sequence control signals are applied as inputs to IYQY encoder 304 (which accomplishes the transformation from NTSC format to the format shown in FIG. 1). Details of encoder 304, which are fully described in the aforesaid co-pending application of Acampora, et al., are not of importance to the present invention. What is important to the present invention, however, is the operation of D flip-flop 302 for deriving phasing signals $\phi$ and $\bar{\phi}$ (only one of which is essential) for designating the horizontal scan line as an IY scan line (i.e., scan line 1 of FIG. 1), or, alternatively, as a QY scan line (scan line 2 of FIG. 1). As shown in FIG. 3, continuous wave color carrier $f_{CC}$ is applied to the D input of flip-flop 302, while each successive initialize pulse IP is applied to the clock (CLK) input of flip-flop 302. Since the phase of the color carrier of each successive horizontal scan line of a field is 180° out of phase with the preceding horizontal scan line thereof, flip-flop 302 switches the phasing signal binary value of $\phi$ and $\bar{\phi}$ for each successive horizontal scan line with respect to that of the preceding horizontal scan line of a field.

In a composite NTSC video signal, there is a phase difference of 180° between the respective color carriers of corresponding lines of successive frames. There is nothing in the operation of flip-flop 302, which specifically responds to this 180° phase difference. However, the effect of this 180° phase difference of the color carrier (between corresponding lines of successive frames), in connection with frame-to-frame pre-emphasis and de-emphasis filters, is the problem with which the present invention is concerned.

Referring back to FIG. 2a, the digital output from processor 206 (having the transformed format shown in FIG. 1) is applied as an input to frame-to-frame fine structure pre-emphasis filter 210. Because of the 180° degree phase reversal between the color carriers of corresponding lines of successive frames, discussed above, a pre-emphasis filter 210 having on Ly (N/2)+1 taps requires N frame delays (where N is any given even integer). After pre-emphasis, the digital output from filter 210 is returned to analog form and then frequency modulates microwave transmitter 212, which transmits a pre-emphasized video signal having the format shown in FIG. 1 to a receiver over a satellite communication system.

Figure 2B:
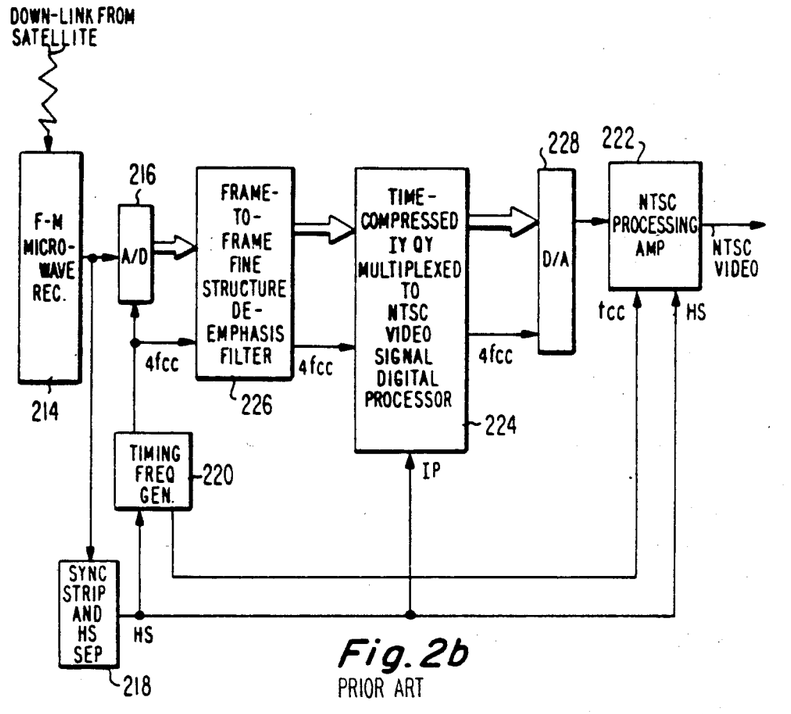

As shown in FIG. 2b, the communicated signal, after detection by FM microwave receiver 214, is applied as an input to both analog-to-digital converter (A/D) 216 and sync stripper and HS separator 218. HS pulse output from block 218, which occurs in time coincidence with the leading edge of each short sync (FIG. 1), is the only transmitter-synchronized time base available to the receiver shown in FIG. 2b. Timing frequency generator 220 includes a phase-locked oscillator, frequency dividers and associated circuitry for deriving a sampling frequency $4f_{CC}$ that has exactly 910 sampling periods within the interval between two successive HS pulses. Generator 220 also derives a continuous-wave color carrier $f_{CC}$ which occurs at any certain arbitrary reference phase. The sampling frequency $4f_{CC}$ is applied as a sampling input to all of the digital elements 216, 224, 226 and 228.

The digital output from A/D converter 216 is applied through frame-to-frame fine structure de-emphasis filter 226 as a video signal input (in the transformed serial multiplexed IYQY format of FIG. 1) to time-compressed IYQY multiplexed to NTSC video signal digital processor 224. The HS pulse is applied as an initialize pulse (IP) to processor 224. Processor 224 (which is described in detail in the aforesaid co-pending application of Acampora, et al. and which is discussed more fully below in connection with FIG. 7) restores both the I and Q time-compressed samples of the chrominance component and the Y luminance component samples of the remainder of the format shown in FIG. 1 back to an NTSC format (after the output from processor 224 is converted back to analog form by D/A 228 and is passed through NTSC processing amplifier 222). Amplifier 222, in response to the reference carrier frequency $f_{CC}$ and the horizontal sync pulse HS, inserts a standard length sync pulse and color burst in the back porch interval of each horizontal scan line. Amplifier 222, during the vertical blanking interval (which is preserved in the output from D/A 228) provides the appropriate vertical blanking and vertical sync signals. In this manner, a complete composite NTSC video signal appears at the output of amplifier 222.

The frame-to-frame fine structure de-emphasis filter 226 of FIG. 2b, like the frame-to-frame fine structure pre-emphasis filter 210 of FIG. 2a, employs only $N(/2)+1$ taps and uses N frame memories (where N is any even integer) in order to accommodate the 180° phase reversal of the color carrier between corresponding lines of successive frames (as discussed above).

The modifications to the structure of FIGS. 2a and 2b, in accordance with the principles of the present invention, make possible frame-to-frame fine structure de-emphasis and pre-emphasis filters having $N+1$ taps and comprising N frame memories (where N is any integer).

Figure 4:
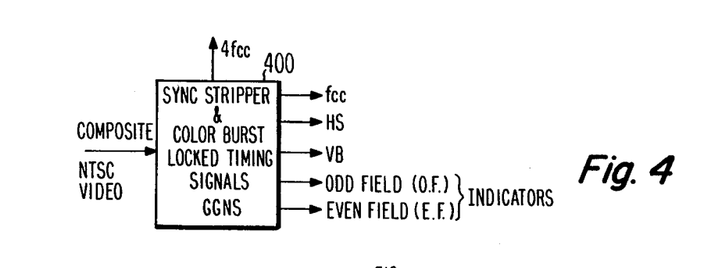
FIG. 4 illustrates a modification of the sync stripper and color burst locked timing signals generators of FIG. 2a, which modified stripper and timing signals generators is employed by the present invention.

More specifically, sync stripper and color burst locked timing signals generators 202 is replaced by sync stripper and color burst locked timing signals generators 400 of FIG. 4. Block 400 is generally similar to block 202 in deriving the $4f_{CC}$ sampling frequency, $f_{CC}$ color carrier, the HS pulse and the VB vertical blanking signal from the applied composite NTSC video. However, block 400 differs from block 202 by also being able to derive odd field (OF) and even field (EF) indicator pulses at the beginning of each respective odd field or even field. Standard sync strippers are available in the art which derive such OF and EF indicators in response to the different predetermined timing relationships which exist between vertical sync and horizontal sync for odd fields and for even fields.

Figure 5:
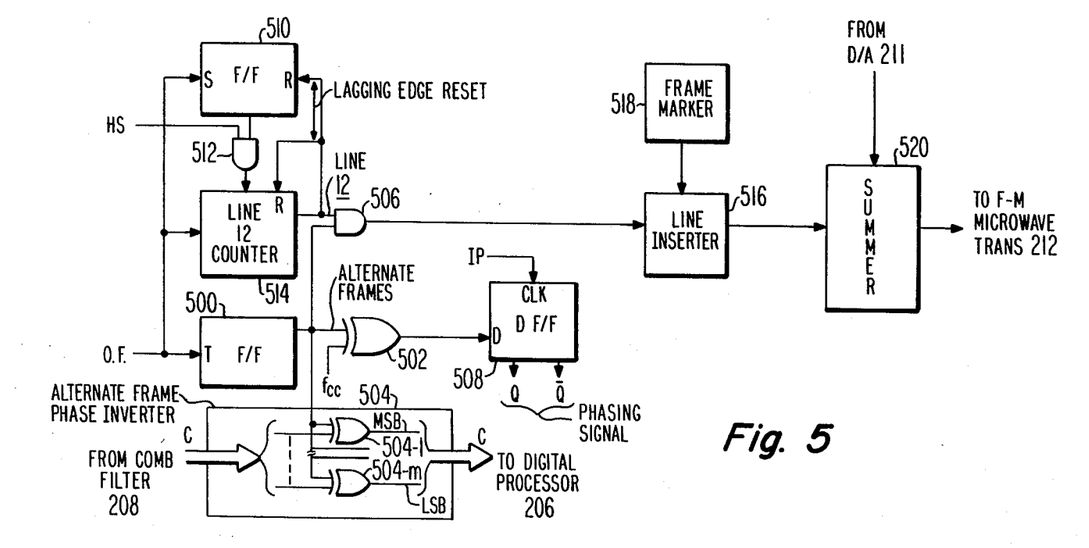
FIG. 5 is a schematic circuit diagram illustrating modifications of the transmitter shown in FIG. 2a in accordance with the principles of the present invention.

Referring to FIG. 5, the OF (odd field) signal from block 400 of FIG. 4 is applied as a toggle (T) input to flip-flop 500, which operates as a divide-by-two element. Thus, the output from flip-flop 500 will be "high" during each of alternate frames of the video signal and will be "low" during each of the remaining frames of the video signal. This output from flip-flop 500 is applied respectively (1) as a first input to exclusive OR gate 502, (2) as a first input to each of the set of exclusive OR gates 504-1 . . . 504-m of the frame phase inverter 504, and (3) as a first input to AND gate 506. In accordance with the modification of the structure of FIG. 2a by the present invention, alternate frame phase inverter 504 is inserted in the C channel coupling the output from comb filter 208 to digital processor 206 in FIG. 2a. As indicated in FIG. 5, the m bits extending from the most significant bit (MSB) to the least significant bit (LSB), representing in digital form the level of each chrominance sample, are individually applied as a second input to exclusive OR gates 504-1 to 504-m of alternate frame phase inverter 504. The color carrier $f_{CC}$ is applied as a second input to exclusive OR gate 502. The output from exclusive OR gate 502 is applied as the D input to D flip-flop 508 and successive initialize pulses IP are applied to the clock (CLK) input of D flip-flop 508. D flip-flop 508 is identical in structure and function to D flip-flop 302 of FIG. 3, described above.

The odd field indicator OF is applied to the set (S) input of flip-flop 510. Flip-flop 510, when set, applies an enabling input to AND gate 512. When enabled AND gate 512 supplies HS pulses as an input to line 12 counter 514. As is known, in an NTSC format, the vertical blanking interval is comprised of the first 21 lines of a field, the first nine lines of which are reserved for vertical sync. Other lines of the vertical blanking interval also may be reserved for certain test purposes or for teletext transmission. However, there are lines of the vertical blanking interval (such as line 12, for example), which are not reserved. The odd field pulse occurs during a predetermined one (not necessarily the first) of the first nine lines of a vertical blanking interval.

Line counter 514 counts the lines of an odd field that occur after flip-flop 510 has been set by an odd field indicator pulse. Counter 514 includes a decoder for producing an output which goes "high" during the occurrence of line 12 of the vertical blanking interval of an odd field (that is, after counter 514 has counted the number of lines equal to the difference between line 12 of that odd field and the predetermined line of that odd field in which the OF pulse occurs). This output from counter 514 is applied as a second input to AND gate 506. In addition, at the end of line 12, the lagging edge of the output from counter 514 (which goes from "high" to "low") is applied to the reset (R) input of both flip-flop 510 and counter 514 to effect the resetting thereof.

The output from AND gate 506, which is applied as an enabling input to line inserter 516, enables line inserter 516 only during line 12 of the odd field alternate frames. Frame marker 518 generates a distinctive signal that is applied to line inserter 516. Thus, line inserter 516 forwards the distinctive signal from frame marker 518 as a first input to summer 520 only during line 12 of the odd field of each alternate frame. Summer 520 combines the distinctive signal from frame marker 518, applied to the first input thereof, with the output from D/A 211, applied to the second input thereof. The combined output from summer 520 is applied as a frequency modulating input to FM microwave transmitter 212. Note that, alternatively, the distinctive signal can be introduced by digital means into the digital form of the signal before D/A 211.

Exclusive OR gate 502 and exclusive OR gates 504-1 . . . 504-m perform the same function of effectively phase inverting the applied data ($f_{CC}$ or the chrominance C from comb filter 208) only during alternate frames when the output from flip-flop 500 is "high." During the remaining frames the data is forwarded without phase inversion. The result is that the 180° phase reversal between corresponding lines of successive frames, originally present in an NTSC format, is eliminated in the chrominance signal processed by digital processor 206. More importantly, the elimination of the 180° phase reversal in the color carrier of corresponding lines of successive frames, permits frame-to-frame fine structure pre-emphasis filter 210 to be an $N+1$ tap filter employing N frame memories (where N is any integer), rather than being only an $(N/2)+1$ tap filter requiring N frame memories (where N is restricted to even integers).

Figure 6:
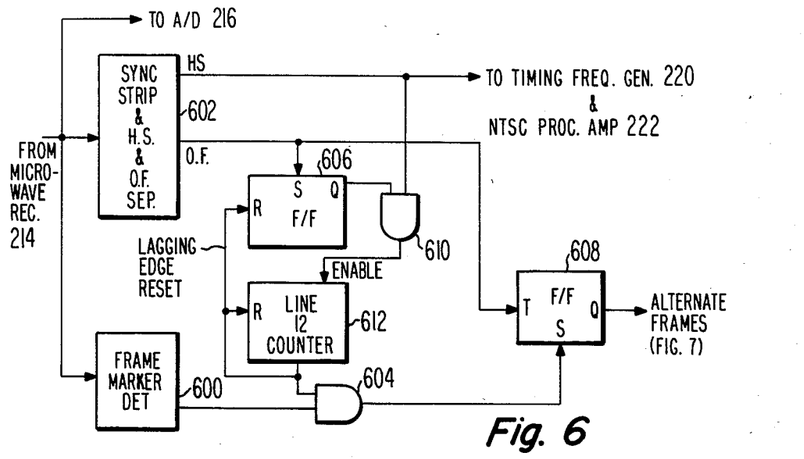
FIG. 6 is a circuit diagram illustrating modifications of the receiver shown in FIG. 2b in accordance with the principles of the present invention.

The frame marker distinctive signal is included in the video signal communicated to the receiver over the satellite communication system. In accordance with the principles of the present invention, the receiver shown in FIG. 2b is modified in accordance with FIG. 6. As shown in FIG. 6, the output from microwave receiver 214 is applied as an input to frame marker detector 600, sync stripper and HS and OF separator 602, and A/D 216. Frame marker detector 600 applies an enabling input to AND gate 604 only in response to the detection thereby of the distinctive frame marker signal. Block 602 is generally similar to block 218 of FIG. 2b, but also derives an odd field (OF) indicator output in a manner similar to that described above in connection with block 400 of FIG. 4. The OF output is applied as a set (S) input to flip-flop 606 and as a toggle (T) input to flip-flop 608. The output from flip-flop 606 is applied as first input to AND gate 610. The horizontal sync HS pulse from separator 602 (besides being applied to timing frequency generator 220 and NTSC processing amplifier 222) is applied as a second input to AND gate 610. The output from AND gate 610 is applied as an input to line 12 counter 612. The output from line counter 612 is applied as a second input to AND 604 and also to the reset (R) inputs of flip-flop 606 and line counter 612, to effect the reset thereof by the lagging edge of the line counter 612 output. Flip-flop 606, AND gate 610 and line counter 612 operate in a manner similar to the corresponding elements 510, 512 and 514 of FIG. 5 to derive a "high" output from line counter 612 only during line 12 of each odd field. AND gate 604, which is enabled only during odd fields of alternate frames, applies an output to the set (S) input of flip-flop 608 only during line 12 of odd fields of alternate frames. Flip-flop 608 toggles back and forth between these two states in response to successive OF indicators applied to its toggle input. Initially, flip-flop 608 may or may not be properly phased with respect to the occurrence of alternate frames defined by the output from frame marker detector 600. The set input ensures that flip-flop 608 becomes properly phased, (if this is not already the case), so that thereafter the output from flip-flop 608 is "high" for all of each of the alternate frames during which detector 600 detects (during the twelfth line of the odd field thereof) a frame marking signal and is "low" during all of each of the remaining frames.

The structure of time-compressed IYQY multiplexed to NTSC video signal digital processor 224 of FIG. 2b is described in detail in the aforesaid co-pending application of Acampora, et al. Block 224a, in simplified form, illustrates the structure of block 224, modified in accordance with the principles of the present invention. More specifically, the structure of both blocks 224 and 224a include a DE-MUX (de-multiplexer) 700, which separates the 93 I compressed samples of IY scan lines and the 93 Q compressed samples of QY scan lines from the remaining Y samples (see FIG. 1). The time compressed I and Y samples are expanded and delayed by I/Q expansion 702, so that at the output of I/Q expansion 702 they occupy the appropriate positions in the active video portion of each horizontal scan line (FIG. 1). However, there are still seven samples missing from each successive set of eight consecutive samples of each horizontal scan line of the original NTSC video signal. 2D (dimension) interpolation filter 704 is employed to reinsert the missing samples of the C component of the NTSC reconstructed video signal. In the structure of block 224 (as described in the aforesaid co-pending patent application), the output from I/Q expansion 702 would be applied directly to the input of 2D interpolation filters 704. However, in the present case, phase inversion of the chrominance component of each of alternate frames occurred at the transmitter. Therefore, it is necessary in the present case to re-invert the inverted chrominance component of each of these alternate frames in order to restore the chrominance component to the proper NTSC phase. This is accomplished in block 224a by inserting alternate frame phase inverter 706 between the output of I/Q expansion 702 and 2D interpolation filter 704. Alternate frame phase inverter 706, which is substantially identical in structure to transmitter alternate frame phase inverter 504 of FIG. 5, inverts the I and Q samples of the horizontal scan lines of the proper alternate frames only in response to an alternate frames input applied thereto from flip-flop 608 being present.

Figure 7:
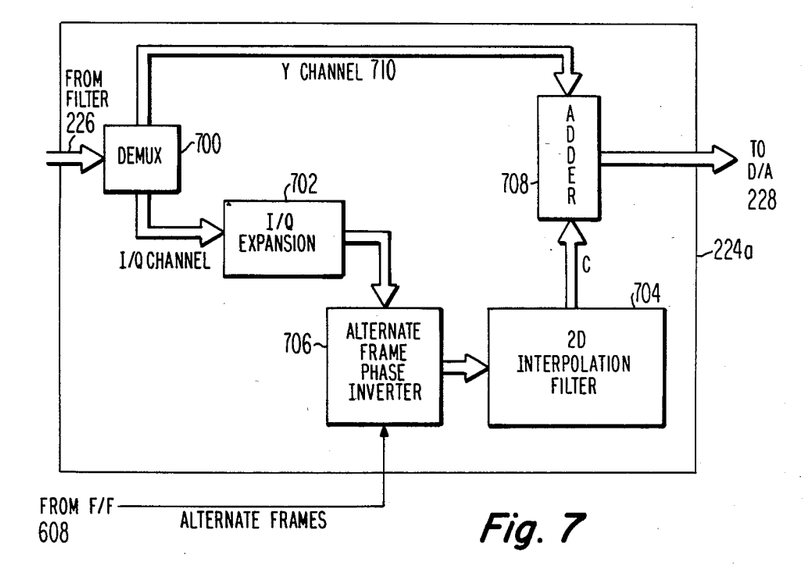
FIG. 7 is a functional block diagram of the time-compressed IYQY multiplexed to NTSC video signal digital processor of FIG. 2b, including modifications thereof in accordance with the principles of the present invention.

The chrominance (C) output of 2D interpolation filter 704 is applied as one input to adder 708. The Y output of de-multiplexer 700 is applied over Y-channel 710 as a second input to adder 708. Y-channel 710 includes delay means (not shown) to provide a delay substantially equal to the delay experienced by the chrominance component between de-multiplexer 700 and the first input to adder 708. Adder 708 produces a digital output equal to the sum of the Y samples and the C samples, which output is applied to D/A 228.

Figure 8:
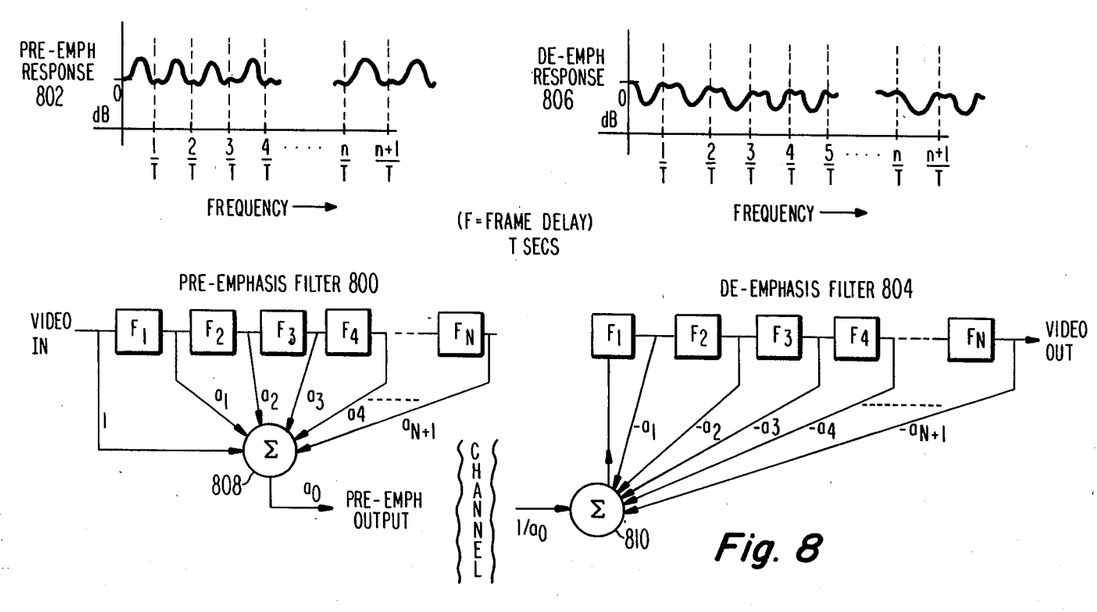
FIG. 8 illustrates examples of the type of FIR filter that can be employed as the frame-to-frame fine structure pre-emphasis filter of the transmitter and the IIR filter that can be employed as the frame-to-frame fine structure de-emphasis filter of the receiver in accordance with the principles of the present invention.

FIG. 8 schematically illustrates a typical frame-to-frame pre-emphasis filter 800, known in the art, for providing the pre-emphasis response 802, and a typical IIR frame-to-frame de-emphasis filter 804, known in the art, having the de-emphasis response 806.

In pre-emphasis filter 800 and de-emphasis filter 804, F is a frame memory that stores all the pixels in a frame, so that a total of N frame memories (F1 ... FN) stores N consecutive frames (each frame memory providing a delay of one frame). Pre-emphasis filter 800 includes N+1 taps (derived from the current frame and each of the past N frames stored in the N frame memories) for applying signals through weighting functions (normalized to a weighting function of unity for the current frame) from each of the N+1 taps to corresponding N+1 inputs of a summing circuit 808. Summing circuit 808 derives a single pre-emphasized output that is normalized by the weighting function $a_0$. This output is communicated over a transmitter-receiver communication channel to de-emphasis filter 804, where it is applied through complementary weighting function $1/a_0$ as an input to summing circuit 810 of de-emphasis filter 804. De-emphasis filter 804, being an IIR filter, includes N+1 taps, N of which are applied as outputs from N frame memories (F1 ... FN) through weighting functions as inputs to summing circuit 810 and one of which is applied as a normalized input to the first frame memory F1 from summing circuit 810.

Each of the frame memories provides a frame delay of one frame period T. As indicated by pre-emphasis response 802, pre-emphasis filter 800 operates as a comb filter for pre-emphasizing odd multiples of half the frame frequency with respect to even multiples of half the frame frequency. Complementary de-emphasis response 806 shows that de-emphasis filter 804 operates as a comb filter for de-emphasizing odd multiples of half the frame frequency with respect to even multiples of half the frame frequency.

In its most simple and least costly form, each of pre-emphasis filter 800 and de-emphasis filter 804, (of the type employed in the present invention) includes only two taps and requires a single frame memory. A better three-tap filter requires two frame memories. In the absence of the present invention, a two-tap filter requires two frame memories and a three-tap filter requires four frame memories.

While the preferred embodiment of the present invention described herein is related to a satellite communication system in which an NTSC is transformed into a serial time-multiplexed IYQY format, it is plain that, regardless of the communication format, the present invention is useful in communicating a frame-to-frame pre-emphasized video signal, originally in a composite NTSC format, from a transmitter to a receiver for use at the receiver as a de-emphasized composite NTSC video signal. The de-emphasis is provided at the receiver by a frame-to-frame de-emphasis filter having a predetermined characteristic that is complementary to that of the pre-emphasis filter.

What is claimed is:

1. A transmitter for use in a television signal communication system comprising said transmitter and a receiver; wherein said transmitter includes translation means for deriving a communication signal communicated to said receiver in response to the application thereto of a composite NTSC format video signal of a two-dimensional image of picture elements (pixels) that are repetitively scanned at the NTSC predetermined frame rate, whereby stationary portions of said image result in a video signal luminance component that recurs at said predetermined frame rate and a video signal chrominance component that recurs only at one-half said predetermined frame rate; said transmitter translation means comprising:

first means for modifying said video signal by phase inverting solely the NTSC color carrier and phase-modulated chrominance component of each of alternate frames of said video signal, thereby providing substantially the same phase for the chrominance component of each of said alternate frames as for the chrominance component of each of the remaining frames of said video signal; and second means including a pre-emphasis comb filter coupled to said first means and responsive to said modified video signal for deriving an output in which those frequency components of said modified video signal which are equal to odd integral multiples of half said predetermined frame rate are pre-emphasized with respect to those frequency components of said modified video signal which are equal to even integral multiples of half said predetermined frame rate.

2. The transmitter defined in claim 1, wherein:

said pre-emphasis comb filter is an (N+1) sample finite impulse response (FIR) filter comprised of (1) a set of N frame memories (where N is any given integer), said set of N frame memories storing all the pixels of each of the N consecutive frames that immediately precede the current frame of said modified video signal, and (2) a weighting and summing circuit coupled to said set of frame memories and responsive to corresponding pixel samples from said current frame and all of said stored N consecutive frames for deriving said pre-emphasized output from said comb filter.

3. The transmitter defined in claim 2, wherein:

said first means includes logic means for generating a frame marker signal occurring at one-half said predetermined frame rate for distinguishing an alternate frame from a remaining frame; and said second means includes encoding means coupled between said first means and said pre-emphasis comb filter for transforming said modified video signal into a serial time-multiplexed IYQY format that is applied to said filter in which (a) each of alternate horizontal scan lines of each frame, designated IY scan lines, is manifested by the presence of a flag preceding a set of time-compressed in-phase chrominance samples followed by luminance samples of that IY scan line, and (b) each of the remaining horizontal scan lines of each frame, designated QY scan lines, is manifested by the absence of said flag preceding a set of time-compressed quadrature-phase chrominance samples followed by luminance samples of that QY scan line.

4. The transmitter defined in claim 3, wherein:

said encoding means includes means responsive to an applied binary phasing signal for designating a scan-line an IY scan-line in response to a first value of said phasing signal and designating a scan-line a QY scan-line in response to a second value of said phasing signal; and said first means is comprised of a sync stripper and phased-locked timing generator responsive to said composite NTSC video signal for extracting therefrom separate control signals defining respectively the phase of the color-carrier frequency, the initiation of each horizontal scan-line, a vertical blanking interval, and the indication of whether the then-occurring field of the composite NTSC signal is odd or even; and said logic means of said first means is responsive to said separate control signals (A) for generating said frame marker signal during every fourth occurring vertical blanking interval, in response to said color-carrier frequency having a reference phase during a given ordinal horizontal scan line of a given one of said odd and even fields; (B) for selectively deriving a first-value phasing signal in response to the initiation of a horizontal scan-line occurring during a negative half-cycle of said color carrier during each of said alternate frames or occurring during a positive half-cycle of said color carrier during each of said remaining frames, (C) for selectively deriving a second-value phasing signal in response to the initiation of a horizontal scan-line occurring during a positive half-cycle of said color carrier during each of said alternate frames or occurring during a positive half-cycle of said color carrier during each of said remaining frames, and (D) for phase inverting only said video signal chrominance component solely during the occurrence of each of said alternate frames.

5. A receiver for use in a television signal communication system comprising a transmitter and said receiver; wherein said transmitter transmits a signal communicated to said receiver that in translated format manifests a composite NTSC format video signal of a two-dimensional image of picture elements (pixels) that are repetitively scanned at the NTSC predetermined frame rate; said translated format including (1) the phase inversion of solely the NTSC color carrier and phase-modulated chrominance component of each of alternate frames of said NTSC format video signal to thereby provide substantially the same phase for the chrominance component of each of said alternate frames as for the chrominance component of each of the remaining frames of said NTSC format video signal; and (2) the pre-emphasis in accordance with a given pre-emphasis characteristic of those frequency components of both said alternate and remaining frames of said translated format which are equal to odd integral multiples of half said predetermined frame rate with respect to those frequency components of both said alternate and remaining frames of said translation format which are equal to even integral multiples of half said predetermined frame rate; said receiver including translation means for translating said translated format back into composite NTSC format that is comprised of:

first means including a de-emphasis comb filter responsive to said translated format signal communicated to said receiver for deriving an output from said first means in which those frequency components of both said alternate and remaining frames of said translated format which are equal to odd integral multiples of half said predetermined frame rate are de-emphasized, in accordance with a de-emphasis characteristic which is substantially complementary to said given pre-emphasis characteristic, with respect to those frequency components of both said alternate and remaining frames of said translated format which are equal to even integral multiples of half said predetermined frame rate; and second means coupled to said first means and responsive to the output therefrom for relatively phase inverting solely the color carrier and phase-modulated chrominance component of said respective alternate frames with respect to solely the color carrier and phase-modulated chrominance component of said respective remaining frames, thereby to provide a composite NTSC format video signal output from said second means.

6. The receiver defined in claim 5, wherein:

said de-emphasis comb filter in an (N+1) sample infinite impulse response (IIR) filter comprised of (a) a set of N frame memories (where N is any given integer), said set of frame memories storing all the pixels of each of the N consecutive frames that immediately precede the current frame of said translated format signal communicated to said receiver, and (b) a weighting and summing circuit coupled to said set of frame memories and responsive to corresponding pixel samples from said current frame and all of said stored N consecutive frames for deriving a de-emphasized output from said comb filter.

7. The receiver defined in claim 5, wherein said translated format signal communicated to said receiver is encoded as a serial time-multiplexed IYQY format signal in which (A) each of alternate horizontal scan lines of each frame, designated IY scan lines, is manifested by the presence of a flag preceding a set of time-compressed in-phase chrominance samples followed by luminance samples of that IY scan line, (B) each of the remaining horizontal scan lines of each frame, designated QY scan lines, is manifested by the absence of said flag preceding a set of time-compressed quadrature-phase chrominance samples followed by luminance samples of that QY scan line, and (C) said alternate frames are distinguished from said remaining frames by a frame-marker signal occurring at one-half said predetermined frame rate;

said first means includes decoding means coupled between said de-emphasis comb filter and said second means for transforming the output from said comb filter from said IYQY format into a modified NTSC format that appears at the output of said first means, in which said modified NTSC format is comprised during each individual frame of simultaneously occurring luminance and phase-modulated color carrier components, but in which the color carrier and phase-modulating chrominance components of both said respective alternate and remaining frames still have the same relative phase with respect to one another; and said second means includes means responsive to said frame marker signal for determining the proper reference phase for a locally generated NTSC color carrier for both said alternate frames and said remaining frames of said composite NTSC video signal output from said second means.

* * * * *